United States Patent
Chiang

(10) Patent No.: US 10,265,718 B2
(45) Date of Patent: Apr. 23, 2019

(54) ATOMIZING DEVICE

(71) Applicant: Taiwan Puritic Corp., Hsinchu County (TW)

(72) Inventor: Chun-Tai Chiang, Taipei (TW)

(73) Assignee: TAIWAN PURITIC CORP., Hsinchu County (TW)

( * ) Notice: Subject to any disclaimer, the term of this patent is extended or adjusted under 35 U.S.C. 154(b) by 0 days.

(21) Appl. No.: 15/489,021

(22) Filed: Apr. 17, 2017

(65) Prior Publication Data

US 2018/0029065 A1    Feb. 1, 2018

(30) Foreign Application Priority Data

Jul. 27, 2016    (TW) .............................. 105123807 A

(51) Int. Cl.
*F24F 6/14*    (2006.01)
*B05B 17/06*    (2006.01)

(52) U.S. Cl.
CPC ............ *B05B 17/0653* (2013.01); *F24F 6/14* (2013.01)

(58) Field of Classification Search
CPC .......... A61M 15/0085; A61M 15/0065; B05B 17/0653; F24F 6/14
USPC ..................................................... 239/102.2
See application file for complete search history.

(56) References Cited

U.S. PATENT DOCUMENTS

| | | | | |
|---|---|---|---|---|
| 2,266,705 A | * | 12/1941 | Fox et al. ............... | A61M 11/06 128/200.22 |
| 5,363,842 A | * | 11/1994 | Mishelevich ........ | A61B 8/0875 128/200.14 |
| 5,419,315 A | * | 5/1995 | Rubsamen ........ | A61M 15/0065 128/200.14 |
| 5,511,539 A | * | 4/1996 | Lien .................. | A61M 15/0085 128/200.14 |
| 5,551,416 A | * | 9/1996 | Stimpson .......... | A61M 15/0085 128/200.14 |
| 5,921,232 A | * | 7/1999 | Yokoi .................. | A61M 15/00 128/200.14 |
| 2008/0223953 A1 | * | 9/2008 | Tomono ................ | A01M 1/205 239/102.2 |

* cited by examiner

*Primary Examiner* — Chee-Chong Lee
(74) *Attorney, Agent, or Firm* — Muncy, Geissler, Olds & Lowe, P.C.

(57) ABSTRACT

An atomizing device includes a first liquid chamber to store a liquid to be atomized; a nozzle plate unit disposed on the first liquid chamber and used to spray the liquid into first atomized droplets; and an indirect spray unit disposed at a position where the first atomized droplets are sprayed to accept the first atomized droplets. The indirect spray unit includes a channel structure having a droplet inlet disposed toward a position where the nozzle plate unit sprays out the first atomized droplets; and a droplet outlet disposed on one side wall of the atomizing device. The droplet inlet receives the first atomized droplets to enter the indirect spray unit. The first atomizing droplets undertake striking and rebounding repeatedly in the channel structure to form the second atomized droplets. The second atomized droplets are sprayed out from the droplet outlet.

7 Claims, 4 Drawing Sheets

ATOMIZING DEVICE

BACKGROUND OF THE INVENTION

1. Field of the Invention

The present invention relates to an atomizing device, particularly to an atomizing device having an indirect spray unit.

2. Description of the Prior Art

A desktop air humidifier is usually used in a dry climate, atomizing the liquid of the humidifier into droplets to increase the humidity of the air. Generally speaking, the liquid should be atomized into droplets having a smaller diameter lest the air be over-humidified by larger droplets. In the conventional technology, a high-frequency oscillation plate undertakes high-frequency oscillations in a liquid to atomize the liquid. The heat generated by oscillation may overheat the machine and increase the risk of malfunction. If the liquid has additives, such as essences, flagrances, etc., heat may denature the additives.

Therefore, it is necessary for the manufacturers to provide an atomizing device able to atomize liquid into droplets having a smaller diameter without generating too much heat.

SUMMARY OF THE INVENTION

The present invention provides an atomizing device, which comprises a first liquid storage chamber having a liquid storage room to store the liquid to be atomized; a nozzle plate unit disposed in the liquid storage chamber and spraying the liquid into first atomized droplets; and an indirect spray unit disposed in a position where the first atomized droplets are sprayed out to receive the first atomized droplets. The indirect spray unit is a channel structure having a droplet inlet and a droplet outlet. The droplet outlet is disposed on one side wall of the atomizing device. The droplet inlet faces the position where the nozzle plate unit sprays the first atomized droplets to receive the first atomized droplets to enter the indirect spray unit. The first atomized droplets undertake striking and rebounding in the channel structure repeatedly to form second atomized droplets. The second atomized droplets are sprayed out from the droplet outlet of the indirect spray unit.

In one embodiment, the diameter of the droplet inlet is larger than the diameter of the droplet outlet.

In one embodiment, the channel structure has a first surface, a second surface and a pair of third surfaces. The first surface and the second surface are opposite to each other and connected by the pair of third surfaces to form the channel structure.

In one embodiment, the first surface is tilted with respect to the second surface by a preset angle.

In one embodiment, the preset angle is within a range of 30-80 degrees.

In one embodiment, the diameter of the second atomized droplets is smaller than the diameter of the first atomized droplets.

In one embodiment, the first atomized droplets undertake striking and rebounding between the first surface and the second surface repeatedly to form the second atomized droplets.

In one embodiment, the atomizing device further comprises a second liquid storage chamber disposed in the periphery of the first liquid storage chamber and interconnected with the first liquid storage chamber by an interconnection unit.

In one embodiment, after entering the indirect spray unit, the first atomized droplets undertake striking and rebounding between at least two of the first surface, the second surface and the third surfaces to form third atomized droplets; the third atomized droplets are ejected toward the droplet inlet.

In one embodiment, the third atomized droplets fall into the second liquid storage chamber and flow back to the first liquid storage chamber through the interconnection unit.

In one embodiment, the nozzle plate unit is detachably installed in the first liquid storage chamber.

In one embodiment, the nozzle plate unit includes a base and a nozzle plate structure. The nozzle plate structure is disposed on the base and has a plurality of electric-conduction contacts electrically connected with a plurality of external-connection contacts of the base.

Below, embodiments are described in detail with the attached drawings to make easily understood the objectives, technical contents, characteristics and accomplishments of the present invention.

DESCRIPTION OF THE PREFERRED EMBODIMENTS

Figure 1:
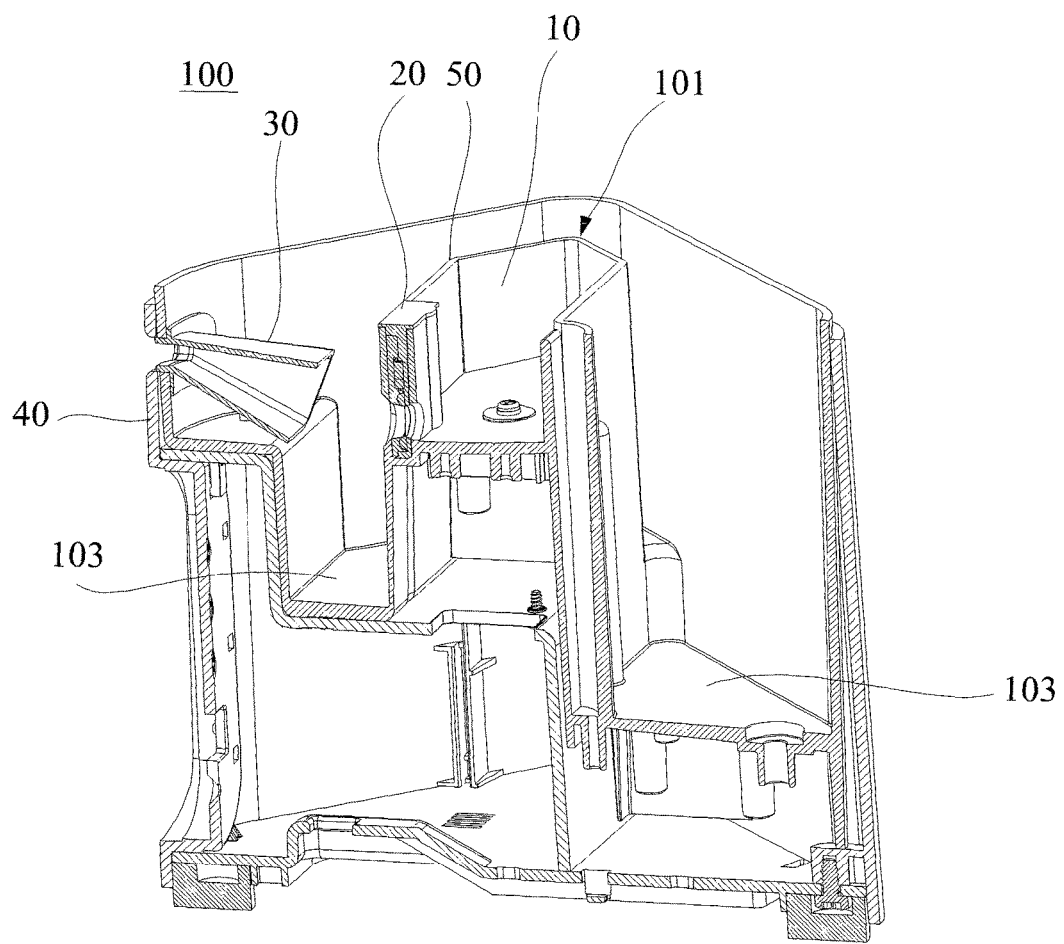
FIG. 1 is a sectional view schematically showing an atomizing device according to one embodiment of the present invention.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Figure 2:
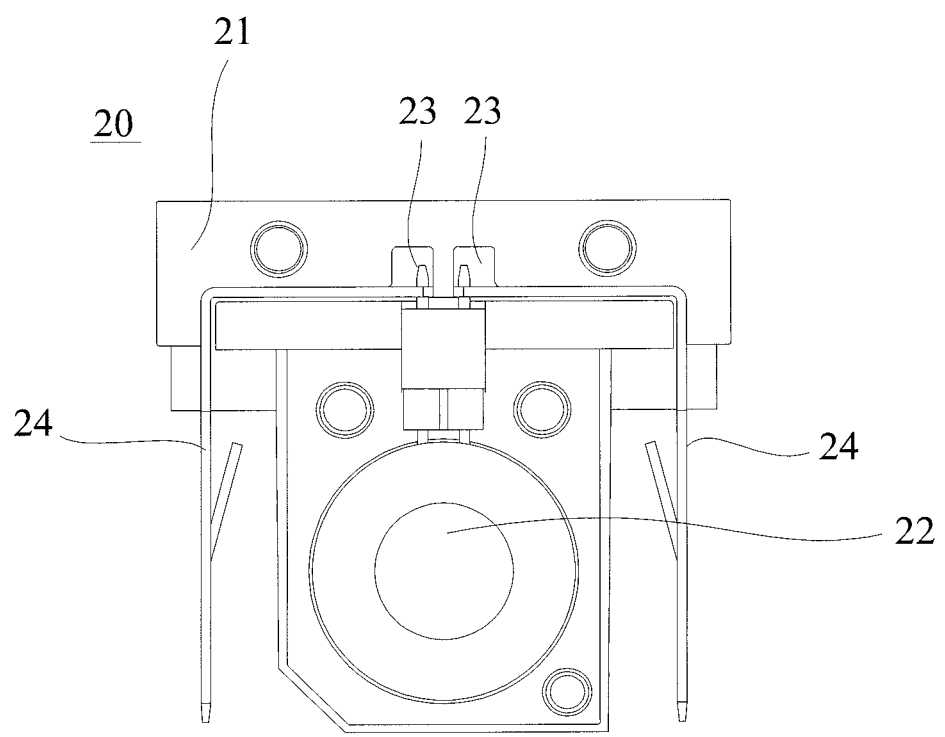
FIG. 2 is a diagram schematically showing the structure of a nozzle plate unit according to one embodiment of the present invention.
Figure 4:
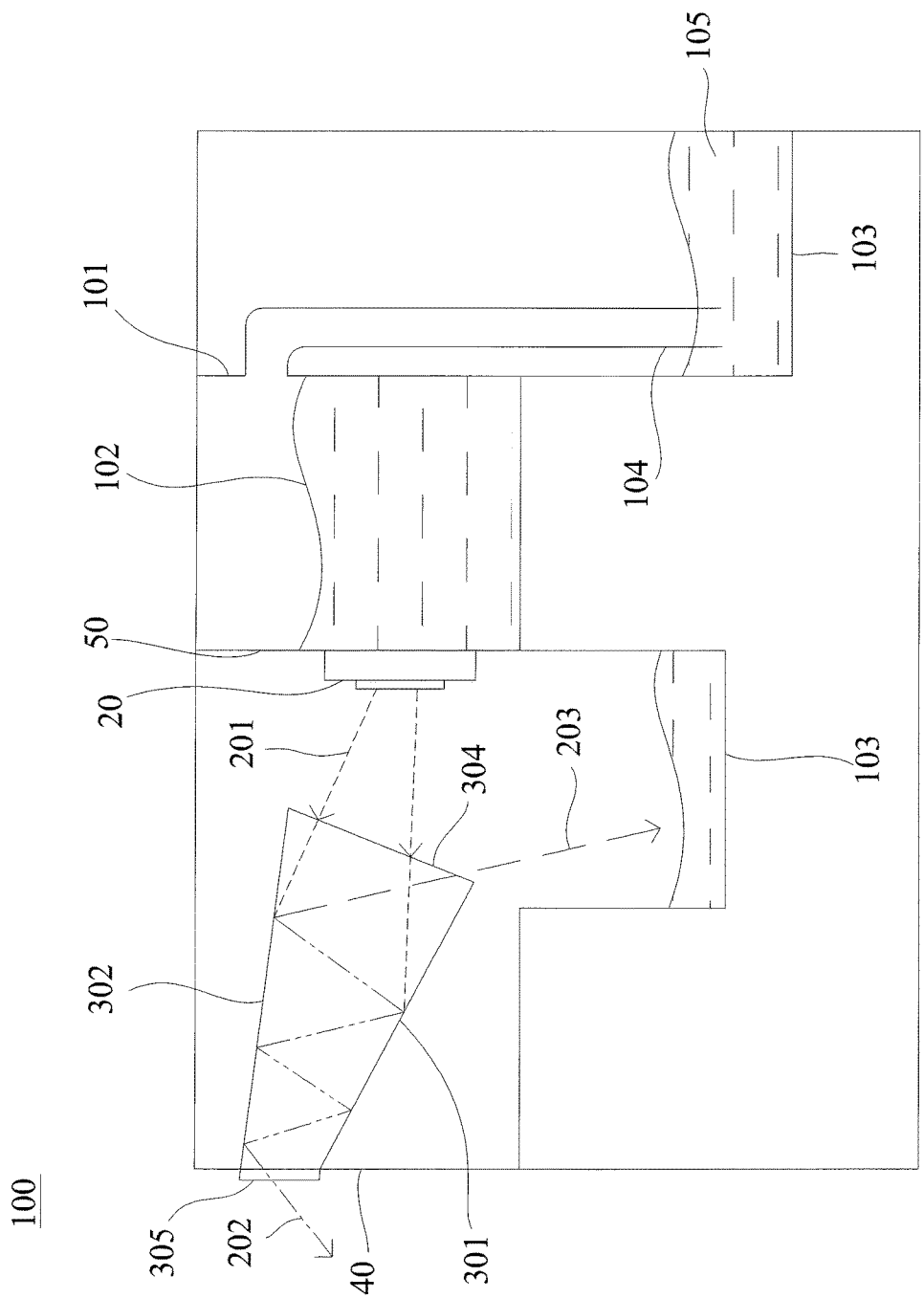
FIG. 4 is a diagram schematically showing the operation of an atomizing device according to one embodiment of the present invention.

Refer to FIG. 1. The atomizing device 100 of the present invention comprises a first liquid storage chamber 101, a nozzle plate unit 20, and an indirect spray unit 30. The first liquid storage chamber 101 has a liquid storage room 10 storing a liquid 102 to be atomized, as shown in FIG. 4. The nozzle plate unit 20 is disposed on one side wall of the liquid storage room 10 and used to spray the liquid 102 into first atomized droplets 201, as shown in FIG. 4. Refer to FIG. 2 a diagram schematically showing the structure of a nozzle plate unit according to one embodiment of the present invention. The nozzle plate unit 20 includes a base 21 and a nozzle plate structure 22. The nozzle plate 22 is disposed on the base 21 and has a plurality of electric-conduction contacts 23 electrically connected with a plurality of external-connection contacts 24 of the base 21. The nozzle plate unit 20 is detachably installed on a wall 50 of the first liquid storage chamber 101, whereby the user can easily replace the nozzle plate unit.

Figure 3:
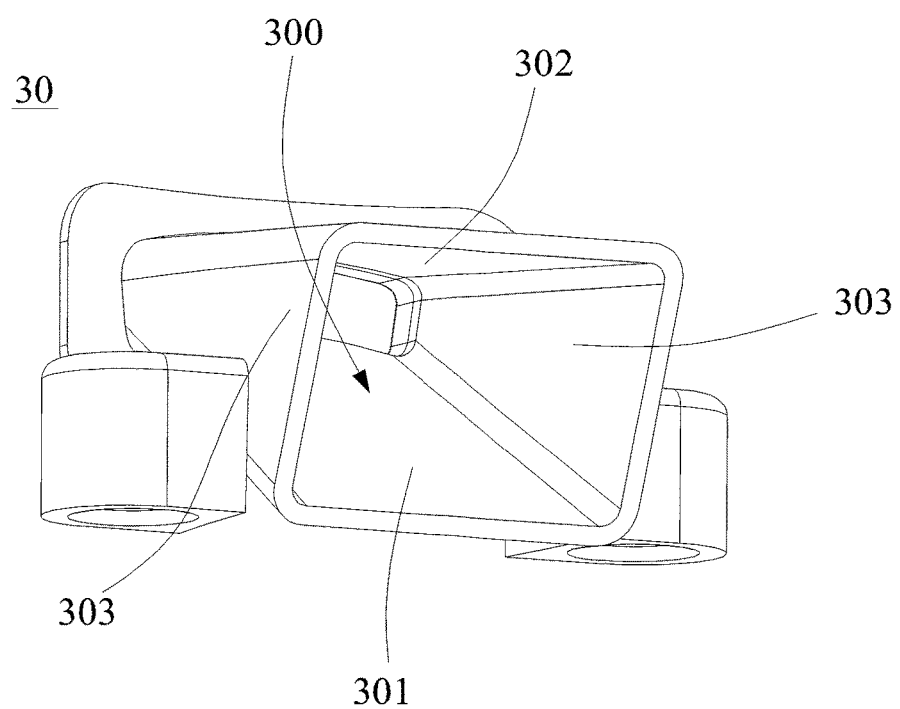
FIG. 3 is a diagram schematically an indirect spray unit according to one embodiment of the present invention.

The indirect spray unit 30 is disposed in a position where the first atomized droplets 201 are sprayed out by the nozzle plate unit 20 to receive the first atomized droplets 201. Refer to FIG. 3 and FIG. 4 for the structure of the indirect spray unit 30. The indirect spray unit 30 is a channel structure 300 having a droplet inlet 304 and a droplet outlet 305. The diameter of the droplet inlet 304 is larger than the diameter of the droplet outlet 305. The droplet outlet 305 is disposed on one side wall 40 of the atomizing device 100. The droplet inlet 304 faces the position where the nozzle plate unit 20 sprays the first atomized droplets 201. The channel-structure 300 has a first surface 301, a second surface 302 and a pair of third surfaces 303. The first surface 301 and the second surface 302 are opposite to each other and connected by the pair of third surfaces 303 to form the channel structure 300. In one embodiment, the first surface 301 is tilted with respect to the second surface 302 by a preset angle, preferably a preset angle within a range of 30-80 degrees. In the drawings of the specification, the channel structure 300 is depicted to be a truncated pyramid exemplarily. The first surface 301 is tilted with respect to the second surface 302. In the indirect spray unit 30 having the abovementioned channel structure 300, the droplet inlet 304 receives the first atomized droplets 201 sprayed by the nozzle plate unit 20 to enter the indirect spray unit 30. The first atomized droplets 201 undertake collisions in the channel structure 300 repeatedly and decompose into droplets having further smaller diameters. The detail thereof will be described thereinafter.

Refer to FIG. 4 for the operation of the atomizing device of the present invention. The first atomized droplets 201 of the liquid 102, which are sprayed by the nozzle plate unit 20, enter the indirect spray unit 30 via the droplet inlet 304 of the channel structure 300. The first atomized droplets 201 strike against and rebound from at least two of the first surface 301, the second surface 302, and the pair of third surfaces 303 repeatedly to form the second atomized droplets 202. The second atomized droplets 202 are sprayed out from the droplet outlet 305. In one embodiment, the first atomized droplets 201 undertake repeated striking and rebounding between the first surface 301 and the second surface 302 of the channel structure 300 to form the second atomized droplets 202. In the indirect spray unit 30, the first atomized droplets 201 undertake repeated striking and decompose into the second atomized droplets 202 having smaller diameters.

In one embodiment, after entering the indirect spray unit 30, the first atomized droplets 201 undertake repeated striking and rebounding between at least two of the first surface 301, the second surface 302 and the pair of third surfaces 303 to form third atomized droplets 203. The third atomized droplets 203 are ejected toward the droplet inlet 304. In one embodiment, the atomizing device 100 further comprises a second liquid storage chamber 103 disposed in the periphery of the first liquid storage chamber 101 and interconnecting with the first liquid storage chamber 101 through an interconnection unit 104. While the first atomized droplets 201 strike the indirect spray unit 30 and generate the third atomized droplets 203 moving in a direction opposite the second atomized droplets 202, the third atomized droplets 203 fall into the second liquid storage chamber 103. Once the liquid 105 accumulates to a given amount in the second liquid storage chamber 103, the liquid 105 will flows through the interconnection unit 104 back to the first liquid storage chamber 101. The liquid flow-back design can effectively recycle the liquid and achieve an environment protection function.

In conclusion, the present invention proposes an atomizing device having an indirect spray unit, wherein the first surface of the indirect spray unit is tilted with respect to the second surface by a preset angle, whereby the droplets that the nozzle plate unit sprays into the indirect spray unit undertake repeated striking and rebounding to form further smaller droplets, wherefore the present invention has an efficacy of further decreasing the size of droplets and achieves better spray quality. The present invention further has a recycling design: a portion of the droplets rebounding from the indirect spray unit are recycled and reused, whereby is achieved an environment protection effect.

What is claimed is:

1. An atomizing device comprising a first liquid storage chamber having a liquid storage room storing a liquid to be atomized;

a nozzle plate unit disposed on said first liquid storage chamber and spraying said liquid into first atomized droplets; wherein the nozzle plate unit includes a base and a nozzle plate; the nozzle plate is disposed on the base and has a plurality of electric-conduction contacts electrically connected with a plurality of external-connection contacts of the base; wherein the nozzle plate unit is detachably installed on an exterior wall of the first liquid storage chamber; and an indirect spray unit disposed at a position where said nozzle plate unit sprays out said first atomized droplets to receive said first atomized droplets, being a channel structure having a droplet outlet and a droplet inlet, wherein said droplet outlet is disposed on a wall of said atomizing device, and wherein said droplet inlet faces a position where said nozzle plate unit sprays out said first atomized droplets, wherein said droplet inlet receives said first atomized droplets to enter said indirect spray unit, and wherein said first atomized droplets undertake repeated striking and rebounding in said channel structure to form second atomized droplets, and wherein said second atomized droplets are sprayed out from said droplet outlet; wherein said channel structure has a first surface, a second surface and a pair of third surfaces, and wherein said first surface and said second surface are opposite and connected by said third surfaces to form said channel structure; and wherein said first surface is tilted with respect to said second surface by a preset angle; wherein said preset angle is within a range of 30-80 degrees.

2. The atomizing device according to claim 1, wherein a diameter of said droplet inlet is larger than a diameter of said droplet outlet.

3. The atomizing device according to claim 1, wherein a diameter of said second atomized droplets is smaller than a diameter of said first atomized droplets.

4. The atomizing device according to claim 1, wherein said first atomized droplets undertake repeated striking and rebounding between said first surface and said second surface to form said second atomized droplets.

5. The atomizing device according to claim 1 further comprising a second liquid storage chamber disposed in a periphery of said first liquid storage chamber and interconnecting with said first liquid storage chamber through an interconnection unit.

6. The atomizing device according to claim 5, wherein after entering said indirect spray unit, said first atomized droplets undertake striking and rebounding repeatedly in said channel structure to form third atomized droplets, and wherein said third atomized droplets are ejected toward said droplet inlet.

7. The atomizing device according to claim 6, wherein said third atomized droplets fall into said second liquid storage chamber, and wherein liquid in said second liquid storage chamber flows through said interconnection unit back to said first liquid storage chamber.

\* \* \* \* \*